United States Patent
Kuroiwa et al.

(10) Patent No.: US 6,947,961 B2
(45) Date of Patent: *Sep. 20, 2005

(54) ARITHMETIC UNIT AND RECEIVER UNIT

(75) Inventors: Koichi Kuroiwa, Kawasaki (JP); Shoji Taniguchi, Kawasaki (JP); Masami Kanasugi, Kawasaki (JP); Yoshikazu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 620 days.

This patent is subject to a terminal disclaimer.

(21) Appl. No.: 10/078,368

(22) Filed: Feb. 21, 2002

(65) Prior Publication Data

US 2003/0009499 A1 Jan. 9, 2003

(30) Foreign Application Priority Data

Jul. 5, 2001 (JP) ........................................ 2001-204162

(51) Int. Cl.⁷ ............................................... G06F 7/38
(52) U.S. Cl. ...................................... 708/490; 708/520
(58) Field of Search ................................ 708/400, 402, 708/404, 490, 520, 303

(56) References Cited

U.S. PATENT DOCUMENTS 4,689,762 A * 8/1987 Thibodeau, Jr. ............ 708/409
5,371,877 A * 12/1994 Drako et al. ................ 711/109
6,061,783 A * 5/2000 Harriman .................... 712/224
6,115,728 A * 9/2000 Nakai et al. ................ 708/404
6,191,998 B1 * 2/2001 Reddy et al. ........... 365/230.05

FOREIGN PATENT DOCUMENTS

JP  5-20139   3/1993
JP  5-66751   9/1993

* cited by examiner

*Primary Examiner*—Chuong D Ngo
(74) *Attorney, Agent, or Firm*—Arent Fox PLLC

(57) ABSTRACT

There are provided an arithmetic unit and a receiver unit which execute an arithmetic operation at a high speed and allow reduction of the size thereof. An input section inputs data of the data group. First to n-th (n>1) storage sections have a capacity capable of storing at least part or all of the data group. A readout section selects one of the first to n-th storage sections and reads out therefrom a data group already stored therein. An arithmetic section performs a predetermined arithmetic operation between the data group read out by the readout section and the data group newly inputted by the input section. A writing section writes a result of the predetermined arithmetic operation by the arithmetic section in a predetermined one of the storage sections, which is not selected by the reading section as the one from which the data group already stored therein is to be read out.

18 Claims, 9 Drawing Sheets

ARITHMETIC UNIT AND RECEIVER UNIT

BACKGROUND OF THE INVENTION

1. Field of the Invention

The present invention relates to an arithmetic unit and a receiver unit, and more particularly to an arithmetic unit and a receiver unit which receive a data group formed of a plurality of data, and perform a predetermined arithmetic processing operation between the data group and another data group received earlier.

2. Description of the Related Art

In the field of information processing, there are cases in which a data group formed of a plurality of data are received, and a predetermined arithmetic processing operation is carried out between the data group and another data group received earlier.

This kind of operation is employed in a cellular phone system of the W-CDMA (Wideband Code Division Multiple Access) method in integrating a received signal in units of slots to calculate a correlation value between a cellular phone and a base station.

FIG. 8 shows an example of the construction of a conventional integrating circuit employed by the W-CDMA method. As shown in this figure, the conventional integrating circuit is comprised of an ADD (adder) 10, and a DP-RAM (Dual Port Random Access Memory) 11.

The ADD 10 adds received or inputted data (DATA) and data read out from the DP-RAM 11, and outputs data $\Sigma 1$ as the result of the arithmetic operation, i.e. addition.

The DP-RAM 11 reads out and outputs data stored in an address designated by an Address_B signal as data $\Sigma 2$ when a Read_B signal is active, and writes data outputted from the ADD 10 into an area designated by an Address_A signal when a Write signal is active.

It should be noted that the DP-RAM 11 operates in synchronism with a clock signal (CLOCK).

Next, the operation of the conventional integrating circuit will be described.

First, when a first data group is inputted, a control signal from a control system, not shown, causes the output data from the DP-RAM 11 to be "0". As a result, the data supplied to the ADD 10 becomes "0", and "0" is added to data of the first data group so that the data inputted from the ADD 10 is outputted therefrom without any change.

The data outputted from the ADD 10 is stored in an address designated by the Address_B signal. The Address_B signal is increased in increments of 1, and when the maximum address value is reached, the address value is returned to "0000". It should be noted that this process is carried out for each data group, so that the data of each data group outputted from the ADD 10 are sequentially stored in the address "0000" to the maximum address.

Therefore, the data of the first data group are stored in the address "0000" to the maximum address, respectively, without any change.

Subsequently, when a second data group is inputted, the DP-RAM 11 reads the stored data (first data of the first data group) from the address "0000", and supplies the same to the ADD 10.

The ADD 10 adds the first data of the second data group and the first data of the first data group supplied from the DP-RAM 11, and outputs the data $\Sigma 1$ as the result of the computation.

At this time, the Write signal is active, and the Address_A signal designates the address "0000" of the DP-RAM 11, so that the data $\Sigma 1$ as the result of computation is stored in the first address of the DP-RAM 11.

It should be noted that the timing in which the data $\Sigma 2$ is read out precedes the timing in which the data $\Sigma 1$ is written, so that the data $\Sigma 2$ cannot be lost by being overwritten by the data $\Sigma 1$.

FIG. 9 is a diagram useful for explaining the operation of the conventional arithmetic unit.

As shown in the figure, the data $\Sigma 2$ read from the address "0000" of the DP-RAM 11 one clock earlier is added to newly inputted data, and this new result of computation i.e. addition is written as the data $\Sigma 1$ into the same address "0000".

The same operation is carried out between data inputted next and the data stored in the address "0001", and the data $\Sigma 1$ which is a new result of the computation is stored in the address "0001".

By repeatedly carrying out the above operation a predetermined number of times, the inputted data groups are sequentially added, and the result of additions can be outputted as data of integral values.

By the way, the conventional arithmetic unit described above uses the DP-RAM 11, which enables the reading operation and writing operation to be carried out in parallel with each other, so that the computation can be carried out at a high processing speed. On the other hand, the DP-RAM 11 occupies a larger area than a SP-RAM (Single Port RAM), which makes it difficult to reduce the size of the arithmetic unit.

As a result, it is also difficult to reduce the size of a receiver unit, such as a cellular phone which incorporates such an arithmetic unit.

SUMMARY OF THE INVENTION

The present invention has been made in view of the above circumstances, and an object of the invention is to provide an arithmetic unit and a receiver unit which are capable of operating at a high speed and at the same time allow reduction of the size thereof.

To attain the above object, the present invention provides an arithmetic unit that receives a data group formed of a plurality of data, and performs a predetermined arithmetic processing operation between the data group and another data group inputted earlier. This arithmetic unit is characterized by comprising input portion for inputting data of the data group, first to n-th (n>1) storage portion each having a capacity capable of storing at least part or all of the data group, readout portion for selecting one of the first to n-th storage portion and reading out therefrom a data group already stored therein, arithmetic portion for performing a predetermined arithmetic operation between the data group read out by the readout portion and the data group newly inputted by the input portion, and writing portion for writing a result of the predetermined arithmetic operation by the arithmetic portion in a predetermined one of the storage portion, which is not selected by the readout portion as the one from which the data group already stored therein is to be read out.

Further, to attain the above object, the present invention provides a receiver unit that receives a data group formed of a plurality of data, and performs a predetermined arithmetic processing operation between the data group and another data group inputted earlier. This receiver unit is characterized by comprising input portion for inputting data of the data group, first to n-th (n>1) storage portion each having a capacity capable of storing at least part or all of the data group, readout portion for selecting one of the first to n-th storage portion and reading out therefrom a data group already stored therein, arithmetic portion for performing a predetermined arithmetic operation between the data group read out by the readout portion and the data group newly inputted by the input portion, and writing portion for writing a result of the predetermined arithmetic operation by the arithmetic portion in a predetermined one of the storage portion, which is not selected by the readout portion as the one from which the data group already stored therein is to be read out.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The invention will now be described in detail with reference to drawings showing a preferred embodiment thereof.

Figure 1:
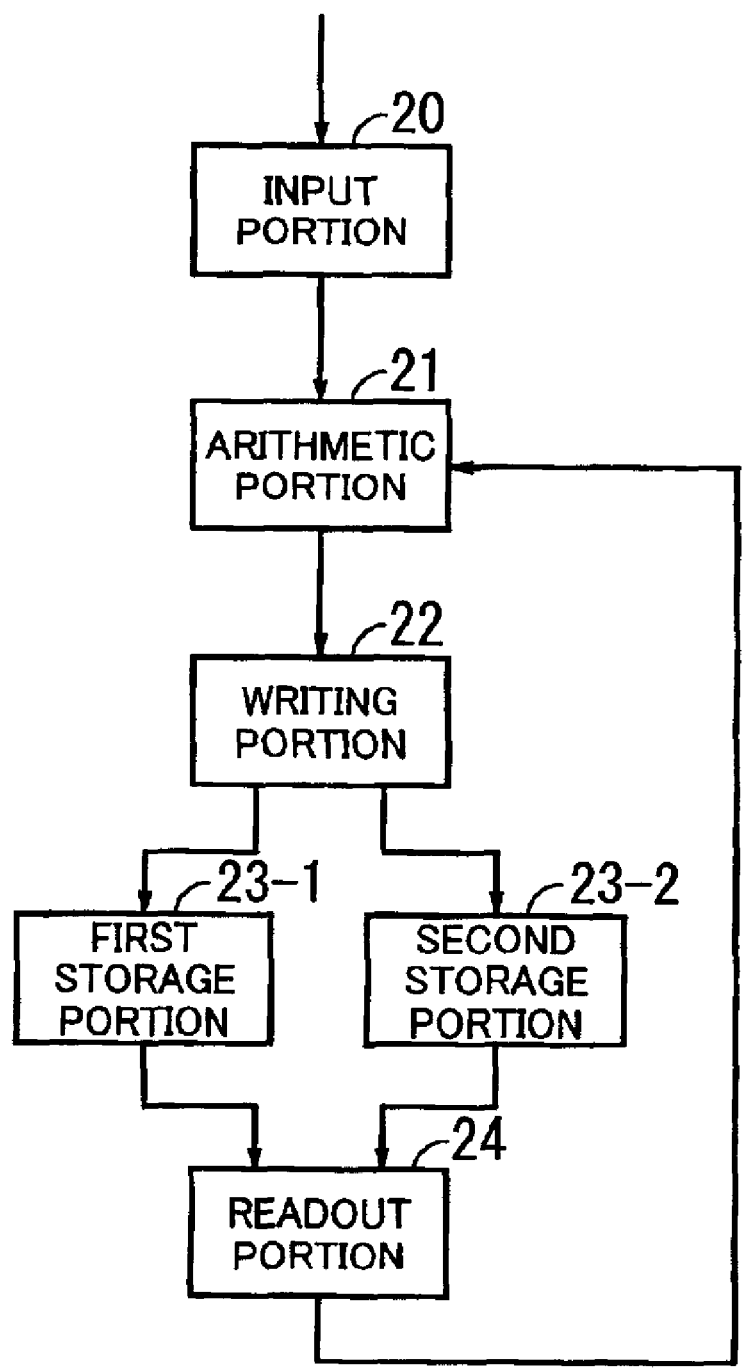
FIG. 1 is a conceptual representation showing principles of operation of an arithmetic unit according to the present invention.

FIG. 1 illustrates the principles of operation of an arithmetic unit according to the present invention. As shown in this figure, the arithmetic unit of the present invention is comprised of input portion 20, arithmetic portion 21, writing portion 22, first storage portion 23-1, second storage portion 23-2, and readout portion 24. This figure corresponds to a case in which "n" in appended claim 1 of the present invention is equal to 2.

The input portion 20 inputs a data group used for computation (arithmetic operation).

The arithmetic portion 21 performs a predetermined arithmetic operation between a data group read out by the readout portion 24 and a data group newly inputted by the input portion 20.

The writing portion 22 writes results of the arithmetic operation by the arithmetic portion 21 into a predetermined storage portion from which data are not to be read out by the readout portion 24.

The first storage portion 23-1 and the second storage portion 23-2 each have a capacity capable of storing at least part or all of a data group.

The readout portion 24 selects either the first storage portion 23-1 or the second storage portion 23-2, and reads from the selected data group already stored therein.

Next, the operation of the arithmetic unit shown in FIG. 1 will be described.

First, before executing the arithmetic processing operation, the first storage portion 23-1 and the second storage portion 23-2 are initialized by using an initial value "0".

Next, the input portion 20 starts inputting of the first data group. At this time, the readout portion 24 reads data stored in an address "0000" of the first storage portion 23-1 (in the present case, the initial value "0") and supplies the read data to the arithmetic portion 21. The arithmetic portion 21 adds the data inputted by the input portion 20 and the data supplied by the readout portion 24 and supplies the result of the addition to the writing portion 22. In the present example, the data supplied from the readout portion 24 is the initial value "0", and hence the data inputted by the input portion 20 is supplied to the writing portion 22 without any change.

The writing portion 22 writes the data outputted from the arithmetic portion 21 in an address "0000" of the second storage portion 23-2 from which data are not to be read by the readout portion 21.

Figure 2:
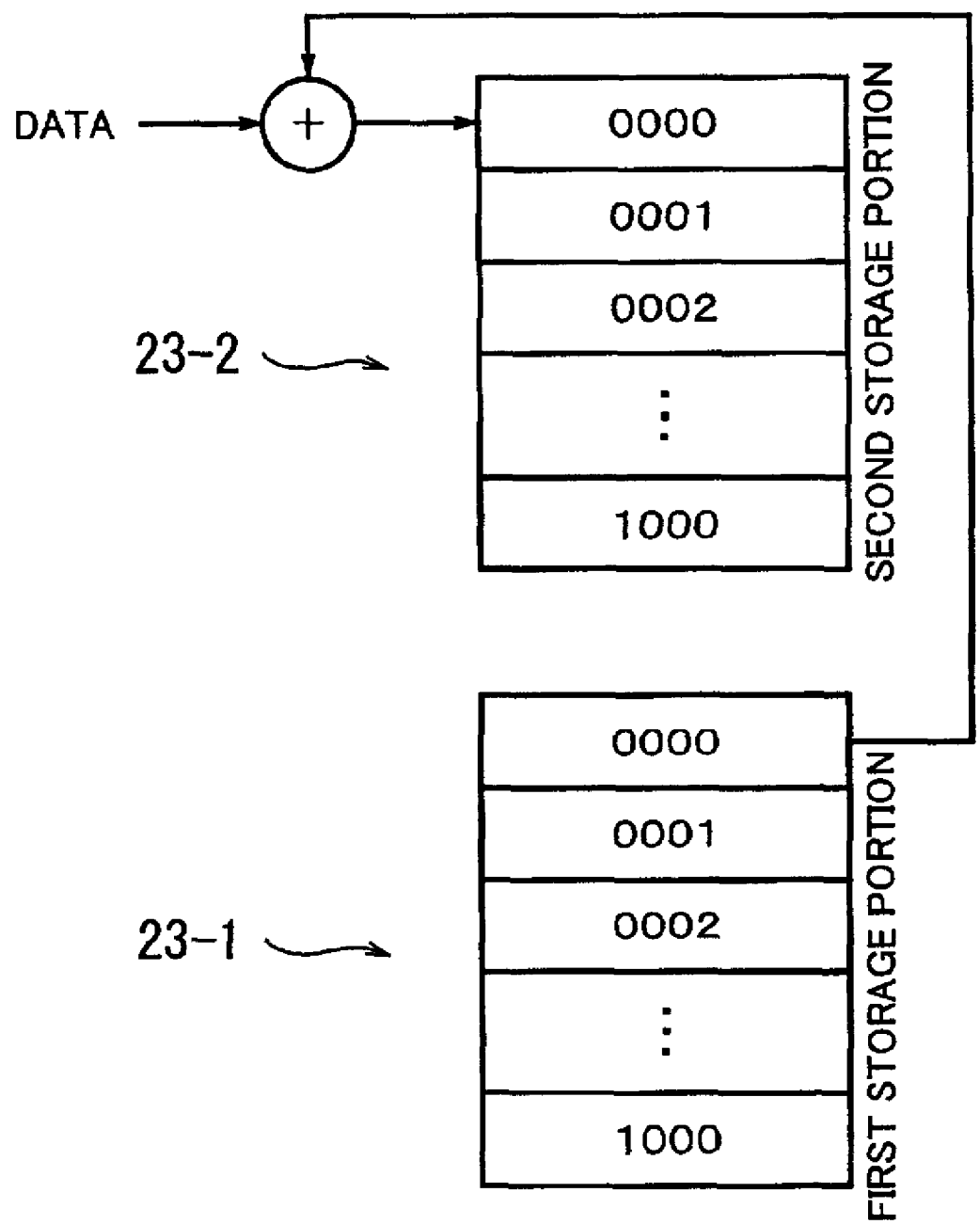
FIG. 2 is a diagram useful for explaining an operation of the FIG. 1 arithmetic unit.

FIG. 2 is a diagram useful for explaining the outline of the above operation. As shown in this figure, the data read out from the address "0000" of the first storage portion 23-1 (initial value "0" in the present case) is added to the first data of the inputted data group, and the resulting sum or data is stored in the address "0000" of the second storage portion 23-2.

Next, when a second data of the first data group is inputted by the input portion 20, the readout portion 24 reads out data from an address "0001" of the first storage portion 23-1, and supplies the read data to the arithmetic portion 21.

The arithmetic portion 21 adds the data supplied by the input portion 20 and the data supplied by the readout portion 24 and supplies the resulting data to the writing portion 22.

The writing portion 22 stores the data supplied from the arithmetic portion 21 into an address "0001" of the second storage portion 23-2.

Figure 3:
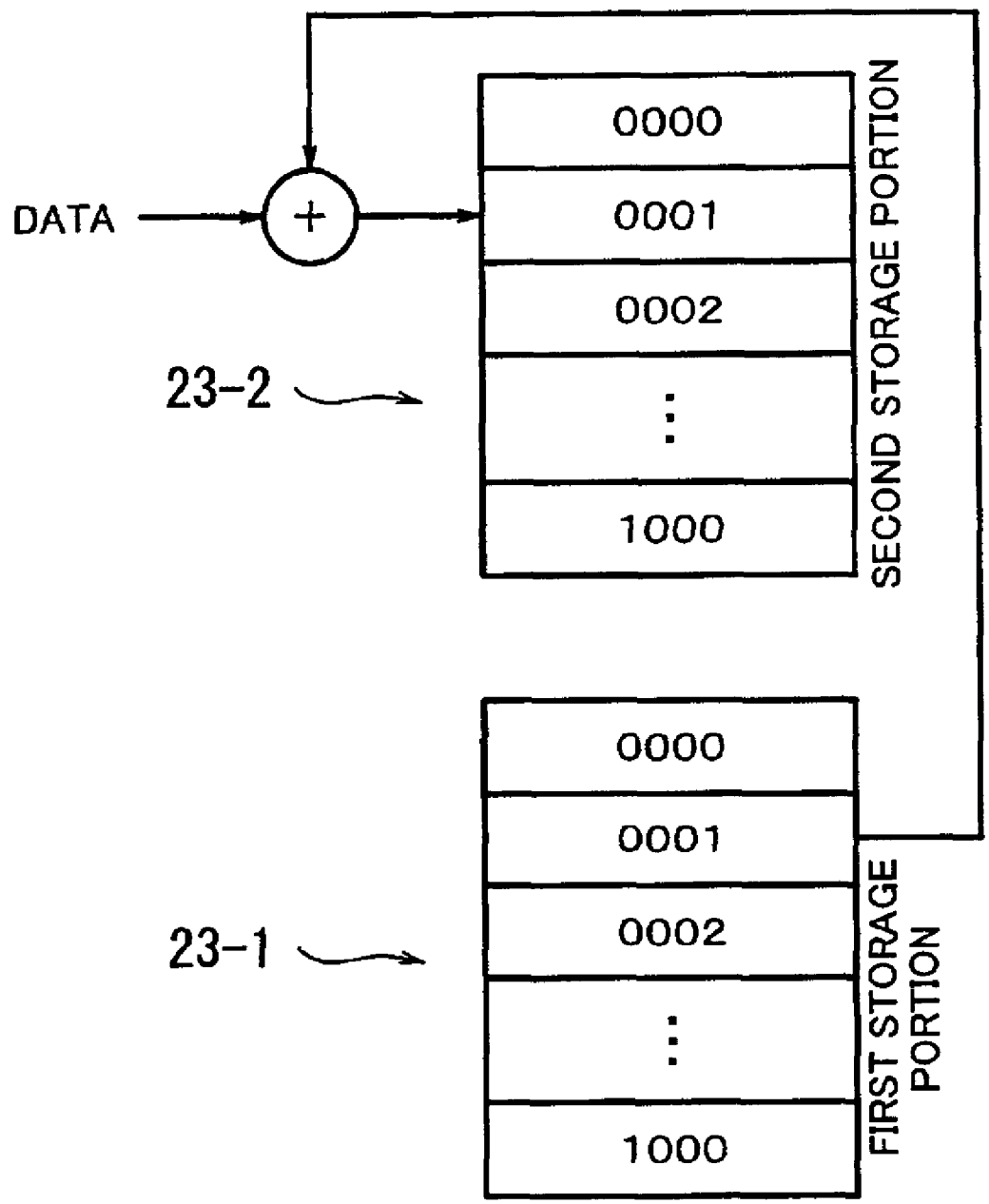
FIG. 3 is a diagram useful for explaining an operation of the FIG. 1 arithmetic unit.

FIG. 3 is a diagram useful for explaining the outline of the above operation. As shown in this figure, the data read from the address "0001" of the fist storage portion 23-1 (initial value "0" in the present case) is added to the inputted second data of the first data group, and the resulting data is stored in the address "0001" of the second storage portion 23-2.

The above operations are repeatedly carried out until the first storage portion 23-1 and the second storage portion 23-2 each reach the maximum address ("1000" in the illustrated example). As a result, all of the first data group inputted by the input portion 20 are stored in the addresses "0000" to "1000" of the second storage portion 23-2.

When processing on the first data group is completed, the writing portion 22 and the readout portion 24 exchange storage portion in which data are to be written and from which data are to be read. More specifically, now the writing portion 22 uses the first storage portion 23-1 as the storage portion into which data are written and the readout portion 24 uses the second storage portion 23-2 as the storage portion from which data are read.

When a first data of a second data group is inputted, the arithmetic portion 21 adds the data supplied by the readout portion 24 and the data supplied by the input portion 20, and supplies the resulting data to the writing portion 22. At this time, the readout portion 24 supplies the data stored in the address "0000" of the second storage portion 23-2, and hence the arithmetic portion 21 adds the data stored in the address "0000" of the second storage portion 23-2 (first data of the first data group) and the first data of the second data group inputted by the input portion 20, and supplies the resulting data to the writing portion 22.

The writing portion 22 writes the data supplied from the arithmetic portion 21 into the address "0000" of the first storage portion 23-1.

Figure 4:
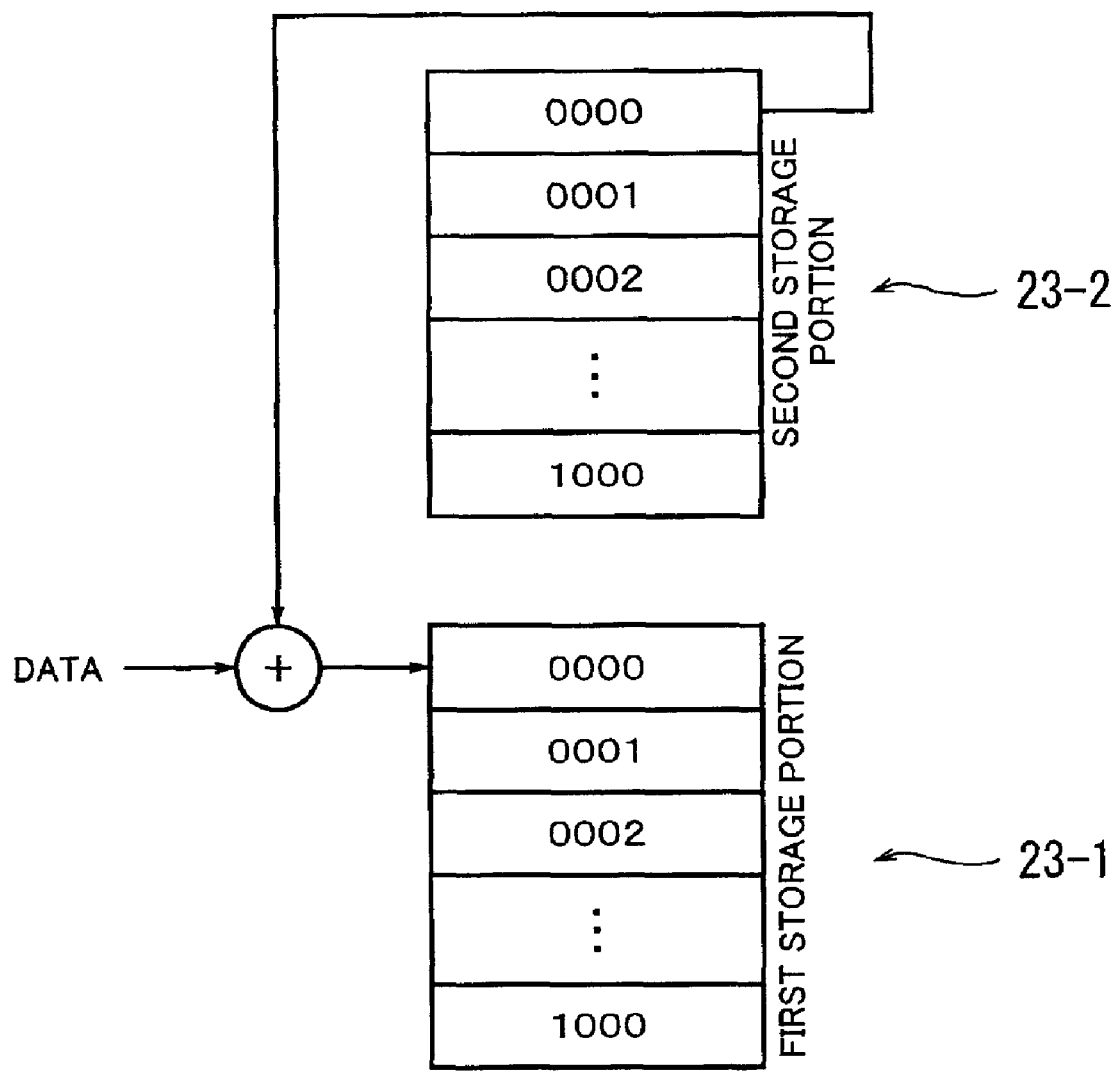
FIG. 4 is a diagram useful for explaining an operation of the FIG. 1 arithmetic unit.

FIG. 4 is a diagram useful for explaining the outline of the above operation. As shown in this figure, the data read from the address "0000" of the second storage portion 23-2 (first data of the first data group in the present example) is added to the first data of the second data group and the resulting data is stored in the address "0000" of the first storage portion 23-1.

Next, the input portion 20 inputs a second data of the second data group, and the readout portion 24 reads out the data stored in the address "0001" of the second storage portion 23-2 (second data of the first data group), and supplies the read data to the arithmetic portion 21.

The arithmetic portion 21 adds the data inputted by the input portion 20 and the data supplied by the readout portion 24, and supplies the resulting data to the writing portion 22. In the present example, the second data of the first data group is supplied by the readout portion 24, while the second data of the second data group is supplied by the input portion 20, and data of the result of the addition is supplied to the writing portion 22.

The writing portion 22 stores the data supplied from the arithmetic portion 21 in the address "0001" of the first storage portion 23-1.

Figure 5:
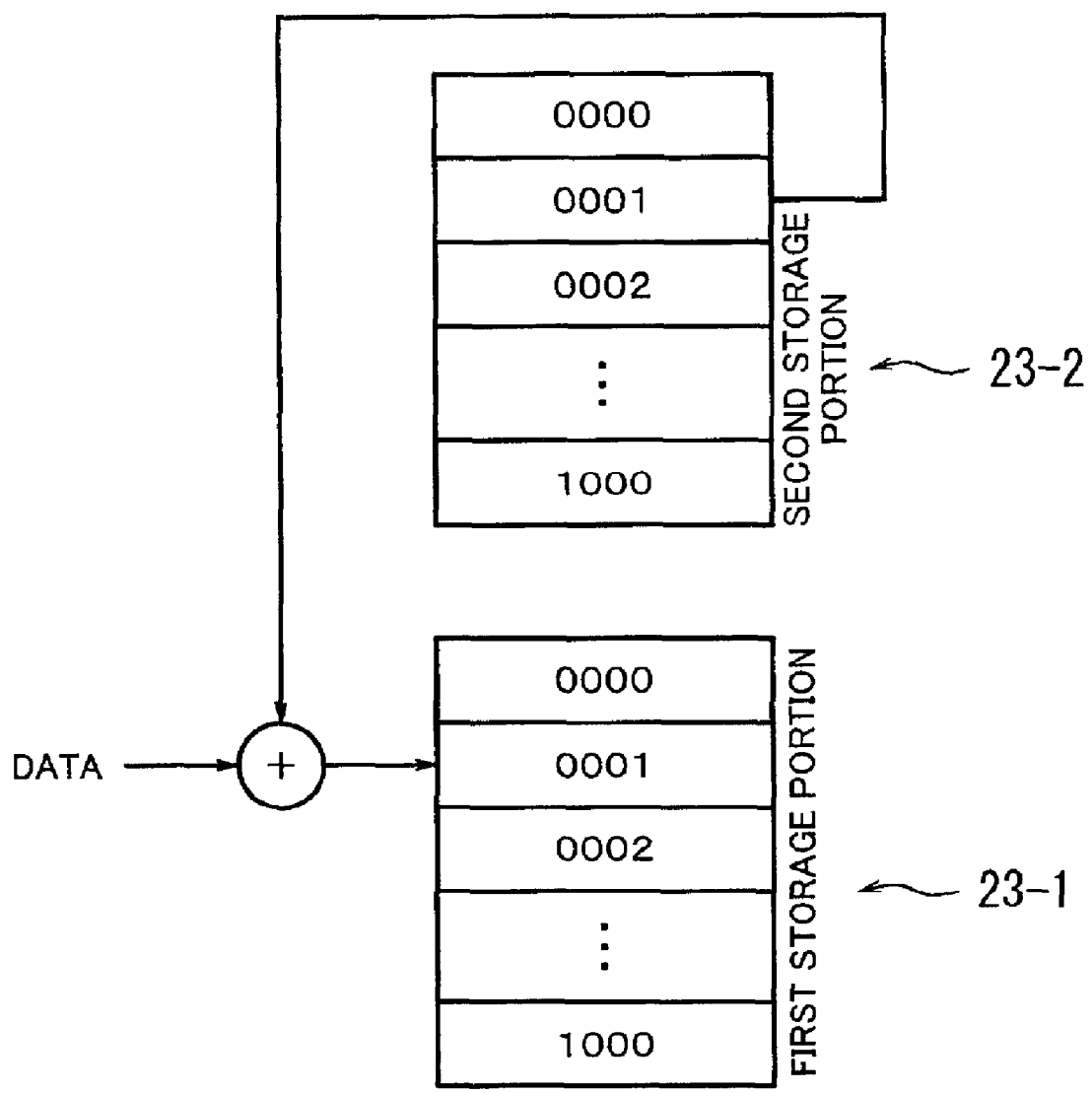
FIG. 5 is a diagram useful for explaining an operation of the FIG. 1 arithmetic unit.

FIG. 5 is a diagram useful for explaining the outline of the above operation. As shown in this figure, the data read from the address "0001" of the second storage portion 23-2 (second data of the first data group in the present example) is added to the inputted second data of the second data group, and the resulting data is stored in the address "0001" of the first storage portion 23-1.

The above operations are repeatedly carried out until the first storage portion 23-1 and the second storage portion 23-2 each reach the maximum address ("1000" in the illustrate example). As a result, all of the second data group inputted by the input portion 20 are added to respective corresponding data of the first data group stored in the second storage portion 23-2, and the resulting data are stored in respective corresponding addresses of the first storage portion 23-1.

After the processing on the second data group is completed, processing on a third data group is carried out. In the processing of the third data group, similarly to the operations illustrated in FIGS. 2 and 3, the data stored in the first storage portion 23-1 (sums of respective corresponding data of the first data group and the second data group), and data of the third data group newly inputted by the input portion 20 are sequentially added, and the resulting sums are sequentially stored in the second storage portion 23-2.

When the processing on the third data group is completed, then, processing on a fourth data group is executed. Thus, the same operations are repeatedly carried out until processing on all the data groups is completed.

Thus, when the processing on an m-th data group which is the last data group is completed, the storage portion (first or second storage portion) into which the writing portion 23-1 finally writes data stores data of cumulative additions (integrations) of all the respective corresponding data of the first to m-th data groups.

By making use of data processed in the above-described fashion, it is possible, for example, to calculate a correlation value of a cellular phone and a base station, which is used in the cellular phone system based on the W-CDMA method.

As described above, according to the arithmetic unit of the present invention, first to n-th storage portion (n=2 in the FIG. 1 example) are provided, and while reading each cumulative sum of the data groups having been processed theretofore, from a predetermined one of the storage portion, operation of adding the read cumulative sum and an inputted data of a new data group is carried out, followed by storing the resulting sum into another one of the storage portion. This makes it possible to use SP-RAMs, for example, as the storage portion. Therefore, it is possible to reduce the size of the arithmetic unit, and realize a high speed arithmetic processing operation similarly to the case in which the DP-RAM is used.

Although in the above diagrams for explaining the principles of the arithmetic unit of the present invention, the two storage portion, i.e. the first storage portion 23-1 and the second storage portion 23-2 are provided, this is not limitative, but it is possible to provide three or more storage portion.

Further, although in the above embodiment, the arithmetic operation is carried out on all of the data groups inputted by the input portion 20, and the resulting sums are stored in the first storage portion 23-1 and the second storage portion 23-2, this is not limitative, but it is also possible to carry out the arithmetic operation on part of the data groups, and store the resulting sums in the first storage portion 23-1 and the second storage portion 23-2.

Next, the embodiment of the present invention will be described.

Figure 6:
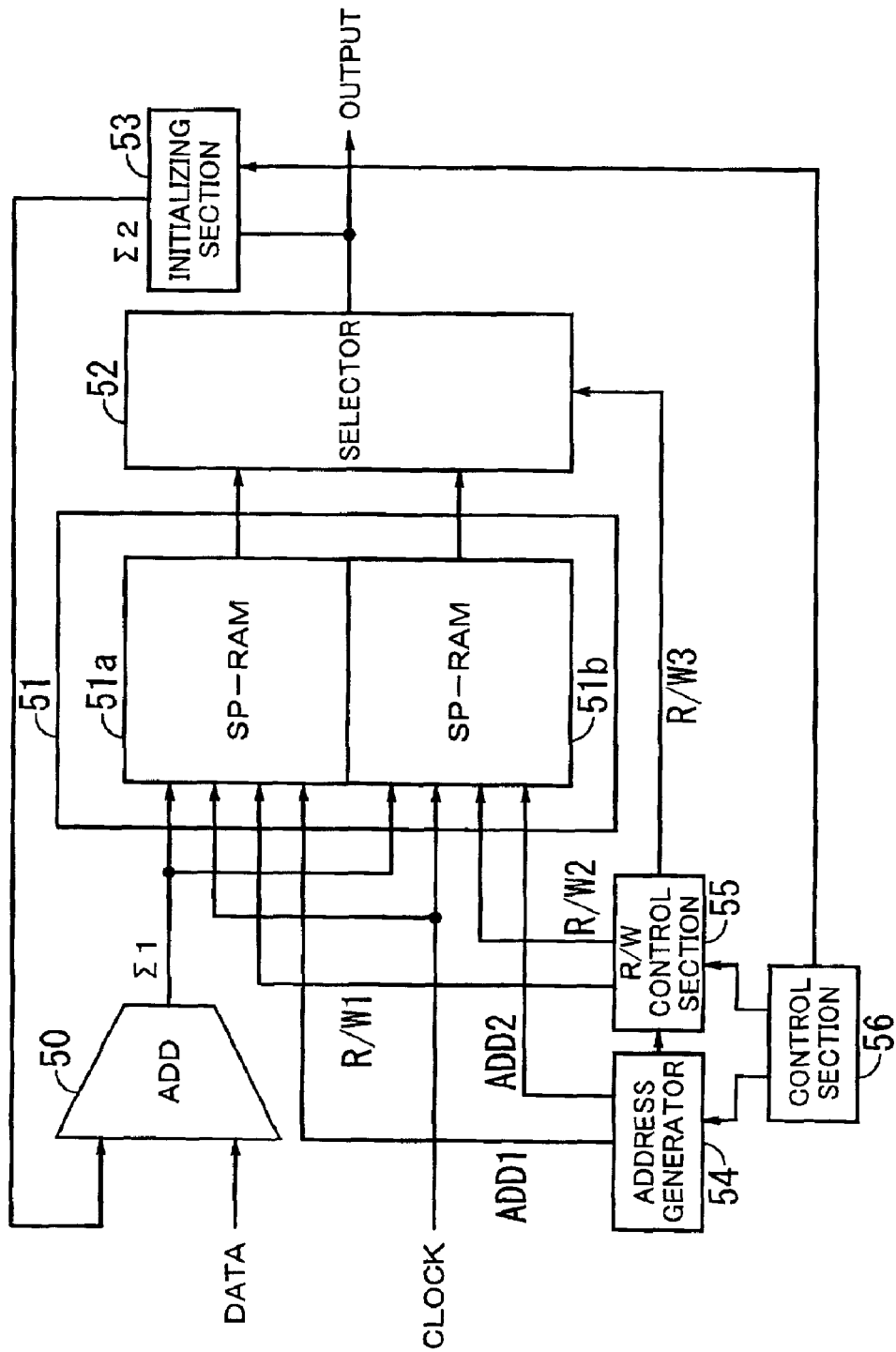
FIG. 6 is a diagram showing the arrangement of an arithmetic unit according to an embodiment of the invention.

FIG. 6 is a diagram showing the arrangement of an arithmetic unit according to the embodiment of the invention. As shown in this figure, the arithmetic unit is comprised of an ADD 50, a storage section 51, a selector 52, an initializing section 53, an address generator 54, an R/W control section 55, and a control section 56.

The ADD 50 adds inputted data (DATA) and data supplied from the selector 52, and supplies the resulting sum or data to a SP-RAM 51b.

The storage section 51 is comprised of an SP-RAM 51a and the SP-RAM 51b. The storage section 51 serves as an SP-RAM which is designated by a control signal from the R/W control section 55, and from which is read out data stored in an address thereof corresponding to a value of an address signal supplied from the address generator 54, and an SP-RAM from which data is not read, and into which is stored a result of arithmetic operation by the ADD 50, at an address corresponding to a value of an address signal supplied by the address generator 54.

The selector 52 selects one of the SP-RAMs which is designated by the R/W control section 55 as one from which data are to be read out, and supplies the read or output data to the initializing section 53.

The initializing section 53 initializes all the data outputted from the selector 52 to "0" when the first data group is inputted, and supplies the resulting data to the ADD 50.

The address generator 54 generates the address signals according to the control of the control section 56, and supplies the address signals to the SP-RAM 51*a* and the SP-RAM 51*b*, respectively.

The R/W control section 55 is under the control of the control section 56 and designates one of the SP-RAM 51*a* and the SP-RAM 51*b* as one from which data are to be read out and the other of them as one into which data are to be written.

The control section 56 controls the address generator 54, the R/W control section 55, and the selector 52.

Next, the operation of the embodiment described above will be described.

Figure 7:
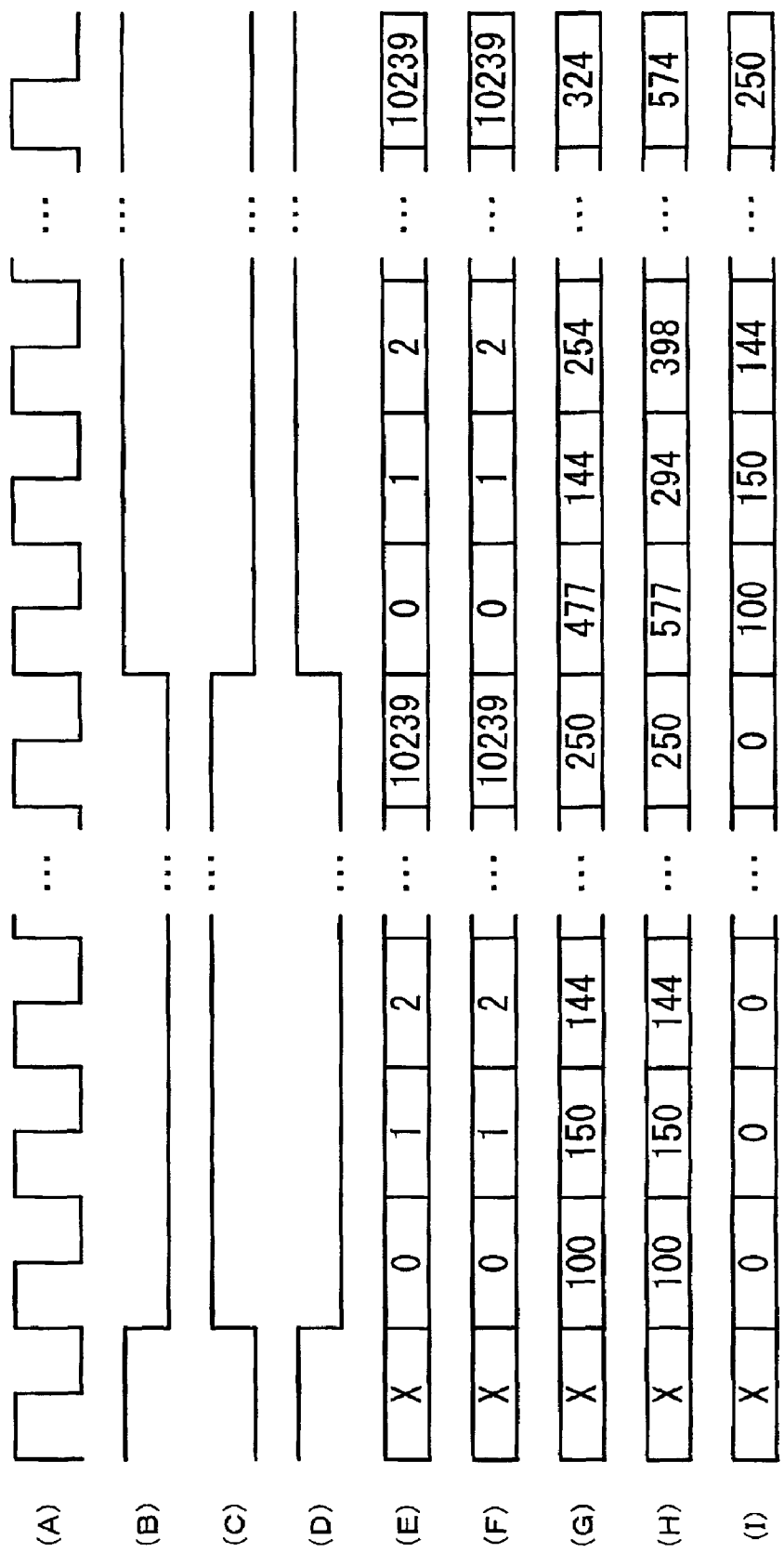
FIG. 7 is a timing chart useful for explaining the operation of the FIG. 6 arithmetic unit.
Figure 8:
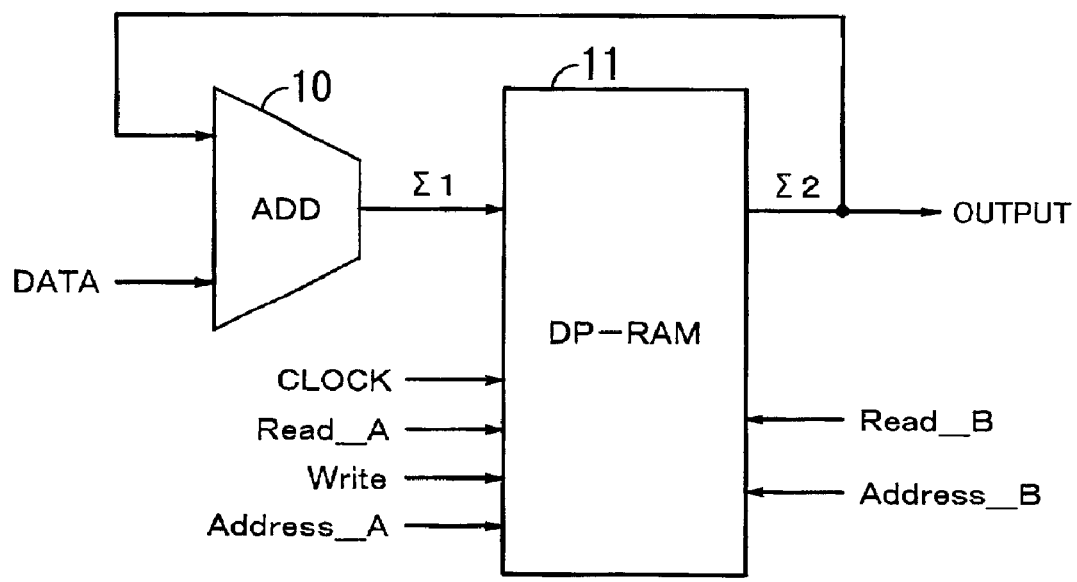
FIG. 8 is a diagram showing an example of the construction of a conventional arithmetic unit.
Figure 9:
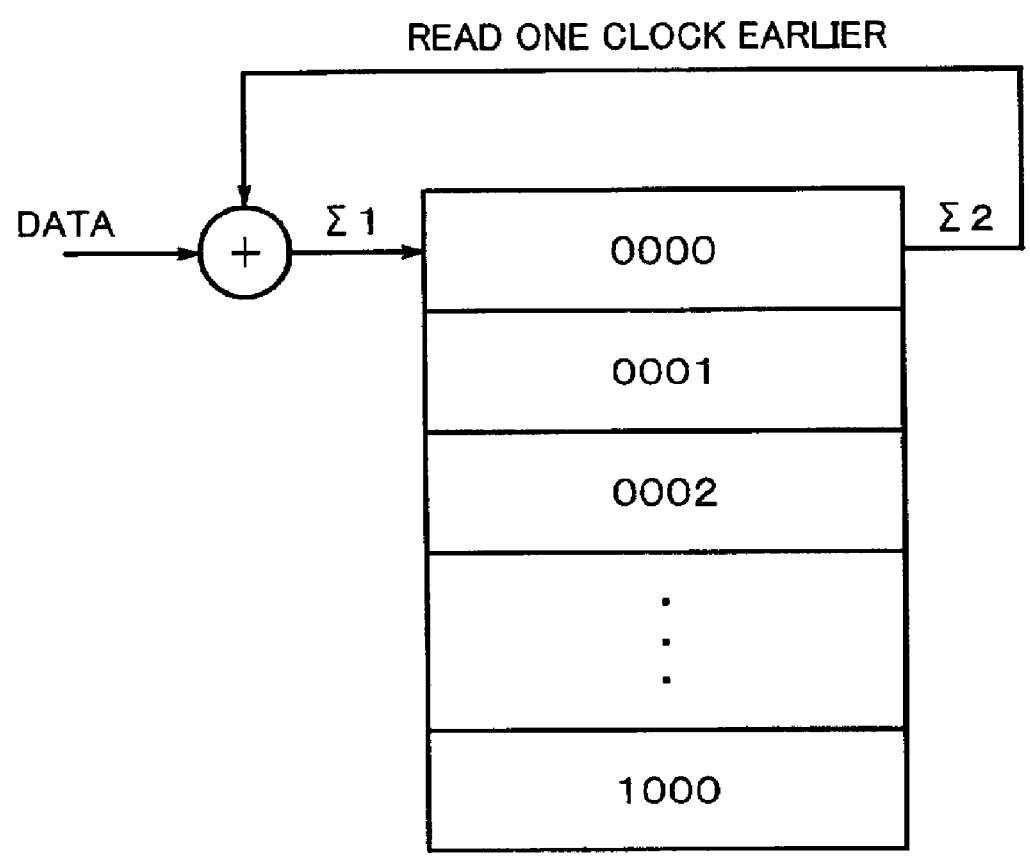
FIG. 9 is a diagram useful for explaining the operation of the FIG. 8 arithmetic unit.

FIG. 7 is a timing chart for explaining the operation of the arithmetic unit according to the present embodiment. Hereafter, the operation of the FIG. 6 arithmetic unit will be explained by referring to FIG. 7 as required.

First, in synchronism with a leading edge of a pulse of a clock signal shown in FIG. 7(A), the control section 56 instructs the initializing section 53 to carry out initialization. Further, the control section 56 instructs the address generator 54 to generate the address signals, and at the same time instructs the R/W control section 55 to generate the R/W signal.

Responsive to the instruction from the control section 56, the address generator 54 performs operations of counting up from "0" to the maximum address "10239", and when the maximum address is reached, the counting operation is carried out in a circulating fashion to start counting up again from "0". Further, the most significant bit (MSB) of the address signal outputted from the address generator 54 contains a signal for designating one of the SP-RAM 51*a* and the SP-RAM 51*b* as one from which data are to be read out (or one into which data are to be written). It should be noted that the SP-RAM 51*a* and the SP-RAM 51*b* are supplied with respective address signals ADD 1 and ADD 2 from which the most significant bit (MSB) is omitted, and hence these address signals provide signals circulating from the value "0" to the value "10239" (see FIGS. 7 (E), (F)).

When the MSB of the data from the address generator 54 is "0", the R/W control section 55 sets an R/W1 signal to "L", an R/W2 signal to "H", and an R/W3 signal to "L". Further, when the MSB of the data from the address generator 54 is "1", the R/W control section 55 sets the R/W1 signal to "H", the R/W2 signal to "L", and the R/W3 signal to "H" (see FIGS. 7 (B) to (D)).

Now, assuming that the supply of a data group to the ADD 50 is started, the ADD 50 adds data Σ2 from the initializing section 53 and inputted data ("100": see FIG. 7 (G)), and outputs the resulting data. In the present example, the initializing section 53 is instructed by the control section 56 to carry out the initialization, "0" is supplied as the data Σ2 to the ADD 50 irrespective of the value of the data outputted from the selector 52 (see FIG. 7 (I)).

The ADD 50 adds the inputted data (="100") and the data (="0") supplied from the initializing section 53, and outputs the resulting data as the data Σ1. At this time, the address generator 54 has outputted the respective address signals ADD 1, ADD 2 having the value of "0" to the SP-RAM 51*a* and the SP-RAM 51*b*. Further, the MSB of each address signal is "0", so that the R/W control section 55 outputs "L" as the R/W1 signal, "H" as the R/W2 signal, and "L" as the R/W3 signal (see FIGS. 7 (B) to (D)).

As a result, the SP-RAM 51*a* is set to a readable state, and the SP-RAM 51*b* is set to a writable state, and the selector 52 is placed in a state selecting the output from the SP-RAM 51*a*.

Accordingly, the data "100" outputted from the ADD 50 is stored in the address "0" of the SP-RAM 51*b*.

Then, when a leading edge of the following pulse of the clock signal arrives, the address generator 54 increments the address value by "1", thereby generating the address signals ADD 1, ADD 2 having the value "1", and supplies the signals to the SP-RAM 51*a* and the SP-RAM 51*b*, respectively.

At this time, the MSB of the address signals is not changed, and hence the SP-RAM 51*a* continues to be the one from which data are to be read, and the SP-RAM 51*b* continues to be the one into which data are to be written. Further, since the initializing section 53 outputs the value "0", the ADD 50 adds the value "0" and the inputted data "150" (see FIG. 7 (G)) and writes the resulting data "150" into the address "1" of the SP-RAM 51*b*.

The above operations are repeatedly carried out until the address value becomes equal to "10239", so that all of the inputted data groups are stored in the SP-RAM 51*b* without any change.

Then, the address generator 54 sets the MSB to "1", and sets all the other bits to "0". As a result, the R/W control section 55 sets the R/W1 signal to "H", the R/W2 signal to "L", and the R/W3 signal to "H", whereby the SP-RAM 51*a* is set to the writable state and the SP-RAM 51*b* is set to the readable state, respectively, and the selector 52 selects and outputs an output from the SP-RAM 51*b*.

It should be noted that at this time the control section 56 instructs the initializing section 53 to terminate the initialization, so that the initializing section 53 supplies the data outputted from the selector 52 to the ADD 50 without causing any change of the data.

In this state, when the second data group is inputted, the SP-RAM 51*b* reads out and outputs data (first data "100" of the first data group) stored in the address "0" thereof.

The selector 52 selects the data supplied from the SP-RAM 51*b*, and supplies the same to the initializing section 53.

The initializing section 53 supplies the data "100" outputted from the selector 52 to the ADD 50 without causing any change of the data. The ADD 50 adds the data "100" outputted from the initializing section 53 and a newly inputted data "477", and stores the resulting data "577" in the address "0" of the SP-RAM 51*a*.

Then, the address generator 54 increments the address value by "1", and outputs the address signals ADD 1, ADD 2 having resulting value "1". As a result, from the address "1" of the SP-RAM 51*b*, the data "150" stored earlier is read out, and supplied to the ADD 50 via the selector 52 and the initializing section 53.

The ADD 50 adds a newly inputted data "144" and the data "150" supplied from the initializing section 53, and supplies the resulting data "294" to the SP-RAM 51*a*.

The SP-RAM 51*a* stores the supplied data "294" in the address "1" thereof.

The above processing operations are repeatedly carried out until the address value becomes equal to "10239". As a result, the SP-RAM 51*a* stores values obtained by adding data of the first data group and data of the second data group, respectively.

Then, the MSB is set to "0", and the bits other than the MSB are set to "0", whereby the arithmetic operation is carried out by setting the SP-RAM 51*a* to the one from which data are to be read, and the SP-RAM 51*b* to the one into which data are to be written.

The above processing operations are repeatedly carried out a predetermined number of times preset by the control section 56, and when additions of all data of all data groups are completed, the data are read from one of the SP-RAMs in which the ultimate results of additions are stored whereby the results of the arithmetic operation can be obtained.

As described above, according to the present embodiment, a plurality of SP-RAMs are provided for using each of them alternately as storage portion from which data are to be read and storage portion into which data are to be written to thereby cumulatively adding inputted data of data groups. This makes it possible to carry out the arithmetic processing operation at a high speed and at the same time reduce the size of the arithmetic unit through the use of SP-RAMs.

It should be noted that although in the above embodiment, the description has been given based on an example of carrying out the arithmetic operation a fixed number of times, this is not limitative, but the number of times of the arithmetic operation may be changed according to circumstances of operation of the arithmetic unit. According to such an embodiment of the invention, it is possible to change the time of integration (data to be integrated) during operation of the arithmetic unit.

Further, the number of times of the arithmetic operation performed in units of blocks may be counted, and when the counted number reaches a predetermined value, the arithmetic operation may be stopped. According to such an embodiment of the invention, it is possible to calculate an integral or cumulative value of data according to the set value.

Further, the number of times of the arithmetic operation performed in units of blocks may be changed in dependence on circumstance of operation or the like. According to such an embodiment of the invention, the optimum operation dependent on the objective or the environment of use of the arithmetic unit can be carried out.

Further, although in the above embodiment described in detail, the two SP-RAMs are used, this is not limitative, but the number of SP-RAMs may be three or more. In such cases, by using a plurality of most significant bits, a desired one of the SP-RAMs can be selected.

Further, although in the above embodiment described in detail, the MSB is used as a bit for use in selection, this is not limitative, but it goes without saying that the LSB or other bit may be used for the same purpose.

Although in the above embodiment described in detail, the initializing section 53 is interposed between the selector 52 and the ADD 50, and the initialization is carried out when the arithmetic operation is executed a first time, this is not limitative, but it goes without saying that various variations of the embodiment can be contemplated. What is required is that data outputted by the ADD 50 in the first cycle of the arithmetic operation carried out on the first data group are equal to the inputted data.

Further, although in the above embodiment, the addition has been described as an example of the arithmetic operation performed between data groups, this is not limitative, but it goes without saying that other arithmetic operation, such as subtraction, can be carried out.

Further, although in the above embodiment described in detail, the operations of reading data from and writing data in respective addresses having an identical address value are carried out in parallel with each other, this is not limitative, but in view of delay at the ADD 50 and the like, the operation of reading data may be carried out prior to the operation of writing data.

Further, although in the above embodiment described in detail, description has been given on the arithmetic unit as a separate unit, this is not limitative, but it goes without saying that such an arithmetic unit can be incorporated in a receiver unit e.g. of a cellular phone.

As described in detail heretofore, according to the present invention, an arithmetic unit that receives a data group formed of a plurality of data, and performs a predetermined arithmetic processing operation between the data group and another data group inputted earlier, and the arithmetic unit comprises input portion for inputting data of the data group, first to n-th (n>1) storage portion each having a capacity capable of storing at least part or all of the data group, readout portion for selecting one of the first to n-th storage portion and reading out therefrom a data group already stored therein, arithmetic portion for performing a predetermined arithmetic operation between the data group read out by the readout portion and the data group newly inputted by the input portion, and writing portion for writing a result of the predetermined arithmetic operation of the arithmetic portion in a predetermined one of the storage portion, which is not selected by the readout portion as the one from which the data group already stored therein is to be read out. Therefore, it is possible to carry out the arithmetic operation at a high speed and at the same time reduce the size of the arithmetic unit.

Further, according to the present invention, a receiver unit that receives a data group formed of a plurality of data, and performs a predetermined arithmetic processing operation between the data group and another data group inputted earlier, and the receiver unit comprises input portion for inputting data of the data group, first to n-th (n>1) storage portion each having a capacity capable of storing at least part or all of the data group, readout portion for selecting one of the first to n-th storage portion and reading out therefrom a data group already stored therein, arithmetic portion for performing a predetermined arithmetic operation between the data group read out by the readout portion and the data group newly inputted by the input portion, and writing portion for writing a result of the predetermined arithmetic operation of the arithmetic portion in a predetermined one of the storage portion, which is not selected by the readout portion as the one from which the data group already stored therein is to be read out. Therefore, it is possible to receive the data at a high speed and at the same time reduce the size of the receiver unit.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An arithmetic unit that receives a data group formed of a plurality of data, and performs a predetermined arithmetic processing operation between the data group and another data group inputted earlier, the arithmetic unit comprising:

input portion for inputting data of the data group;

first to n-th (n>1) storage portion each having a capacity capable of storing at least part or all of the data group;

readout portion for selecting one of the first to n-th storage portion and reading out therefrom a data group already stored therein;

arithmetic portion for performing a predetermined arithmetic operation between the data group read out by the readout portion and the data group newly inputted by the input portion;

writing portion for writing a result of the predetermined arithmetic operation by the arithmetic portion in one of the first to n-th storage portion, wherein the storage portion in which the result is to be written is not selected by the readout portion as the one from which the data group already stored therein is to be read out; and output portion for outputting date of the result of the predetermined arithmetic operation stored in one of the first to n-th storage portion.

2. The arithmetic unit according to claim 1, wherein the first to n-th storage portion are formed by a memory array, and wherein the memory array is used in a bank switching manner so as to be used as the first to n-th storage portion.

3. The arithmetic unit according to claim 2, wherein the memory array is formed by single port memories.

4. The arithmetic unit according to claim 1, further comprising address-generating portion for generating addresses which are accessed by the readout portion and the writing portion, and wherein by using a predetermined bit of each address generated by the address-generating portion, ones of the first to n-th storage portion which are to be accessed by the readout portion and the writing portion are specified.

5. The arithmetic unit according to claim 1, wherein the readout portion reads out data prior to writing by the writing portion.

6. The arithmetic unit according to claim 1, wherein the arithmetic portion executes addition to thereby perform integrating operation in units of data groups.

7. The arithmetic unit according to claim 1, comprising:

operation start-instructing portion for instructing the predetermined arithmetic processing operation to be started, and initializing portion for setting all data of a first data group supplied from the readout portion to an initial value of "0" when the operation start-instructing portion instructs the predetermined arithmetic processing operation to be started.

8. The arithmetic unit according to claim 1, further comprising:

counting portion for counting a number of times of the arithmetic processing operations performed in units of blocks, and stoppage portion for stopping the predetermined arithmetic processing operation when a value counted by the counting portion reaches a predetermined set value.

9. The arithmetic unit according to claim 1, further comprising set value-changing portion for changing a predetermined set value.

10. A receiver unit that receives a data group formed of a plurality of data, and performs a predetermined arithmetic processing operation between the data group and another data group inputted earlier, the receiver unit comprising:

input portion for inputting data of the data group;

first to n-th (n>1) storage portion each having a capacity capable of storing at least part or all of the data group;

readout portion for selecting one of the first to n-th storage portion and reading out therefrom a data group already stored therein;

arithmetic portion for performing a predetermined arithmetic operation between the data group read out by the readout portion and the data group newly inputted by the input portion;

writing portion for writing a result of the predetermined arithmetic operation by the arithmetic portion in one of the first to n-th storage portion, wherein the storage portion in which the result is to be written is not selected by the readout portion as the one from which the data group already stored therein is to be read out; and output portion for outputting date of the result of the predetermined arithmetic operation stored in one of the first to n-th storage portion.

11. The receiver unit according to claim 10, wherein the first to n-th storage portion are formed by a memory array, and wherein the memory array is used in a bank switching manner so as to be used as the first to n-th storage portion.

12. The receiver unit according to claim 11, wherein the memory array is formed by single port memories.

13. The receiver unit according to claim 10, further comprising address-generating portion for generating addresses which are accessed by the readout portion and the writing portion, and wherein by using a predetermined bit of each address generated by the address-generating portion, ones of the first to n-th storage portion which are to be accessed by the readout portion and the writing portion are specified.

14. The receiver unit according to claim 10, wherein the readout portion reads out data prior to writing by the writing portion.

15. The receiver unit according to claim 10, wherein the arithmetic portion executes addition to thereby perform integrating operation in units of data groups.

16. The receiver unit according to claim 10, comprising:

operation start-instructing portion for instructing the predetermined arithmetic processing operation to be started, and initializing portion for setting all data of a first data group supplied from the readout portion to an initial value of "0" when the operation start-instructing portion instructs the predetermined arithmetic processing operation to be started.

17. The receiver unit according to claim 10, further comprising:

counting portion for counting a number of times of the arithmetic processing operations performed in units of blocks, and stoppage portion for stopping the predetermined arithmetic processing operation when a value counted by the counting portion reaches a predetermined set value.

18. The receiver unit according to claim 10, further comprising set value-changing portion for changing a predetermined set value.

* * * * *